(12) United States Patent
Okuda et al.

(10) Patent No.: US 6,774,886 B2
(45) Date of Patent: Aug. 10, 2004

(54) DISPLAY SYSTEM, CURSOR POSITION INDICATION METHOD, AND RECORDING MEDIUM

(75) Inventors: Hidehito Okuda, Hyogo (JP); Kazuyasu Nagatomi, Hyogo (JP); Hiroki Fujioka, Hyogo (JP); Hitomi Fujisaki, Hyogo (JP); Michiyo Inagaki, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 195 days.

(21) Appl. No.: 09/875,592

(22) Filed: Jun. 6, 2001

(65) Prior Publication Data

US 2002/0075230 A1 Jun. 20, 2002

(30) Foreign Application Priority Data

Dec. 14, 2000 (JP) ........................................ 2000-379861

(51) Int. Cl.[7] ................................................ G09G 5/08
(52) U.S. Cl. ........................ 345/157; 345/856; 345/156
(58) Field of Search ................................. 345/156, 157, 345/145, 146, 2, 160, 163, 856

(56) References Cited

U.S. PATENT DOCUMENTS

| | | | | |
|---|---|---|---|---|
| 5,047,754 A | * | 9/1991 | Akatsuka et al. | 340/709 |
| 5,298,890 A | * | 3/1994 | Kanamaru et al. | 345/157 |
| 5,473,343 A | * | 12/1995 | Kimmich et al. | 345/145 |
| 5,726,681 A | * | 3/1998 | Kanamori | 345/145 |
| 5,748,189 A | * | 5/1998 | Trueblood | 345/331 |
| 6,031,531 A | * | 2/2000 | Kimble | 345/348 |
| 6,067,085 A | * | 5/2000 | Modh et al. | 345/339 |
| 6,111,562 A | * | 8/2000 | Downs et al. | 345/145 |
| 6,597,383 B1 | * | 7/2003 | Saito | 345/860 |

* cited by examiner

Primary Examiner—Regina Liang
Assistant Examiner—Jennifer T. Nguyen
(74) Attorney, Agent, or Firm—Snell & Wilmer, LLP (57) ABSTRACT

A display system includes: a display section; and a control section for controlling the display section, wherein the control section includes a cursor display section for displaying a cursor on the display section, and a cursor position indication image display section for displaying on the display section, based on a predetermined condition, a cursor position indication image which indicates a position of the cursor displayed by the cursor display section, and the cursor position indication image display section displays the cursor position indication image in the vicinity of the cursor displayed by the cursor display section.

27 Claims, 7 Drawing Sheets

DISPLAY SYSTEM, CURSOR POSITION INDICATION METHOD, AND RECORDING MEDIUM

BACKGROUND OF THE INVENTION

1. Field of the Invention

The present invention relates to a display system, a cursor position indication method, and a recording medium. Specifically, the present invention relates to: a display system including a graphical user interface (hereinafter, "GUI") for indicating a cursor position in a such manner that a user can readily find the cursor position; a cursor position indication method for indicating a cursor position in a such manner that a user can readily find the cursor position; and a recording medium including a computer program for indicating a cursor position in a such manner that a user can readily find the cursor position.

2. Description of the Related Art

In recent years, the use of multi-display systems, in which a plurality of display devices are connected to a single information processing apparatus, has been increasing.

Figure 7:
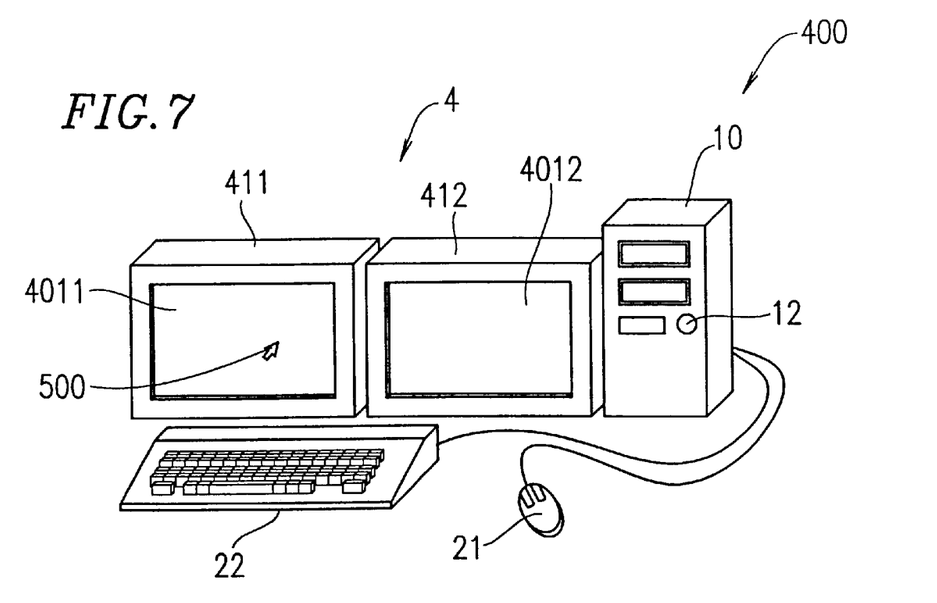
FIG. 7 shows a conventional multi-display system 400.

FIG. 7 shows a conventional multi-display system 400. The multi-display system 400 includes a display section 4, an information processing apparatus 10 for controlling the display section 4, a mouse 21 connected to the information processing apparatus 10, and a keyboard 22 connected to the information processing apparatus 10. The display section 4 includes a first display device 411 and a second display device 412. The first display device 411 has a first display screen 4011, and the second display device 412 has a second display screen 4012. The information processing apparatus 10 includes a power button 12.

On one of the first display screen 4011 and the second display screen 4012, a mouse cursor 500 corresponding to the mouse 21 is displayed. With the mouse 21, a user can freely moves the mouse cursor 500 on the first display screen 4011 and the second display screen 4012.

However, in the conventional multi-display system 400, as compared to a single display system, the user is more likely to lose sight of the mouse cursor 500 on the display screen.

Especially in the following cases, it is difficult for the user to find the position of the mouse cursor 500:

For example, when the user performs an input operation (e.g., a key entry) while the multi-display system 400 is in a power saving mode during which the power of display devices are off, the display devices are powered-on, and the mouse cursor 500 is re-displayed. In such a case, it is difficult for the user to find the position of the re-displayed mouse cursor 500.

Furthermore, when the mouse cursor 500 moves discontinuously from one position to another amongst a plurality of display screens, e.g., when the mouse cursor 500 is moved from one display screen to another by depressing a specific key on the keyboard (hereinafter, such a movement of the mouse cursor is referred to as a "cursor jump"), it is difficult for the user to find the position of the mouse cursor 500.

In a system disclosed in Japanese Laid-Open Publication No. 11-282627, an icon for a mouse cursor is displayed on a screen all the time, and if the mouse cursor is left unmoved for a predetermined time period, the mouse cursor is moved onto the icon. Such a function helps the user to find the mouse cursor. However, since the icon is displayed on the screen all the time, an area on the display screen which the user can freely use is reduced by an area occupied by the icon.

SUMMARY OF THE INVENTION

According to one aspect of the present invention, a display system includes: a display section; and a control section for controlling the display section, wherein the control section includes a cursor display section for displaying a cursor on the display section, and a cursor position indication image display section for displaying on the display section, based on a predetermined condition, a cursor position indication image which indicates a position of the cursor displayed by the cursor display section, and the cursor position indication image display section displays the cursor position indication image in the vicinity of the cursor displayed by the cursor display section.

In one embodiment of the present invention, the cursor position indication image display section displays the cursor position indication image in a position such that a user of the display system can see the cursor position indication image substantially together with the cursor on the display section.

In another embodiment of the present invention, the cursor position indication image display section displays the cursor position indication image such that a central position of the cursor position indication image is positioned substantially on a central position of the cursor.

In still another embodiment of the present invention, the cursor position indication image display section displays the cursor position indication image in such a manner that the user of the display system can readily recognize the cursor position indication image on the display section.

In still another embodiment of the present invention, the predetermined condition includes transition of the cursor from a non-display state to a display state.

In still another embodiment of the present invention, the non-display state includes a state where the power to the display section is off; and the display state includes a state where the display section is powered-on again.

In still another embodiment of the present invention, the display section includes a plurality of display screens; and the cursor display section displays the cursor on one of the plurality of display screens.

In still another embodiment of the present invention, the cursor display section includes a cursor movement section for moving the cursor from one display screen to another display screen amongst the plurality of display screens; and the predetermined condition includes a movement of the cursor by the cursor movement section from one display screen to another display screen among the plurality of display screens.

In still another embodiment of the present invention, the cursor position indication image includes a dynamic image.

In still another embodiment of the present invention, the control section includes a cursor position indication image termination direction section for directing termination of display of the cursor position indication image based on a predetermined termination condition; and the cursor position indication image display section terminates the display of the cursor position indication image on the display section in response to the direction from the cursor position indication image termination direction section.

In still another embodiment of the present invention, the predetermined termination condition includes an expiration of a predetermined time period since the cursor position indication image was displayed on the display section by the cursor position indication image display section for indicating the position of the cursor displayed by the cursor display section.

In still another embodiment of the present invention, the display section includes a single display screen; and the cursor display section displays the cursor on the single display screen.

According to another aspect of the present invention, a cursor position indication method includes: a cursor display step of displaying a cursor on a display section; and a cursor position indication image display step of displaying on the display section, based on a predetermined condition, a cursor position indication image which indicates a position of the cursor displayed by the cursor display step, wherein the cursor position indication image display step includes a step of displaying the cursor position indication image in the vicinity of the cursor displayed by the cursor display step.

In one embodiment of the present invention, the predetermined condition includes transition of the cursor from a non-display state to a display state.

In another embodiment of the present invention, the non-display state includes a state where the power to the display section is off; and the display state includes a state where the display section is powered-on again.

In still another embodiment of the present invention, the display section includes a plurality of display screens; and the cursor display step includes a step of displaying the cursor on one of the plurality of display screens.

In still another embodiment of the present invention, the cursor display step includes a cursor movement step of moving the cursor from one display screen to another display screen amongst the plurality of display screens; and the predetermined condition includes a movement of the cursor by the cursor movement step from one display screen to another display screen among the plurality of display screens.

In still another embodiment of the present invention, the cursor position indication image includes a dynamic image.

In still another embodiment of the present invention, the cursor position indication method further includes a cursor position indication image termination direction step of directing termination of display of the cursor position indication image based on a predetermined termination condition; and the cursor position indication image display step includes a step of terminating the display of the cursor position indication image on the display section in response to the direction by the cursor position indication image termination direction step.

In still another embodiment of the present invention, the predetermined termination condition includes an expiration of a predetermined time period since the cursor position indication image was displayed on the display section at the cursor position indication image display step for indicating the position of the cursor displayed by the cursor display step.

In still another embodiment of the present invention, the display section includes a single display screen; and the cursor display step includes a step of displaying the cursor on the single display screen.

In still another aspect of the present invention, a computer-readable recording medium containing a program for allowing a computer to execute: a cursor display step of displaying a cursor on a display section; and a cursor position indication image display step of displaying on the display section, based on a predetermined condition, a cursor position indication image which indicates a position of the cursor displayed by the cursor display step, wherein the cursor position indication image display step includes a step of displaying the cursor position indication image in the vicinity of the cursor displayed by the cursor display step.

In one embodiment of the present invention, the predetermined condition includes transition of the cursor from a non-display state to a display state.

In another embodiment of the present invention, the non-display state includes a state where the power to the display section is off; and the display state includes a state where the display section is powered-on again.

In still another embodiment of the present invention, the display section includes a plurality of display screens; and the cursor display step includes a step of displaying the cursor on one of the plurality of display screens.

In still another embodiment of the present invention, the cursor display step includes a cursor movement step of moving the cursor from one display screen to another display screen amongst the plurality of display screens; and the predetermined condition includes a movement of the cursor by the cursor movement step from one display screen to another display screen among the plurality of display screens.

In still another embodiment of the present invention, the cursor position indication image includes a dynamic image.

In still another embodiment of the present invention, the program further allows the computer to execute a cursor position indication image termination direction step of directing termination of display of the cursor position indication image based on a predetermined termination condition; and the cursor position indication image display step includes a step of terminating the display of the cursor position indication image on the display section in response to the direction by the cursor position indication image termination direction step.

In still another embodiment of the present invention, the predetermined termination condition includes an expiration of a predetermined time period since the cursor position indication image was displayed on the display section at the cursor position indication image display step for indicating the position of the cursor displayed by the cursor display step.

In still another embodiment of the present invention, the display section includes a single display screen; and the cursor display step includes a step of displaying the cursor on the single display screen.

According to one aspect of the present invention, a user of a display system can readily find a mouse cursor on a display screen even when the display system returns from the power-saving mode and display devices which were off are powered-on again.

According to another aspect of the present invention, even when the mouse cursor jumps between the display devices (cursor jump), the user of the display system can readily find the mouse cursor on the display screen.

Thus, the invention described herein makes possible the advantage of providing a display system, a cursor position indication method, and a recording medium for helping a user of the display system to find a mouse cursor when the display system returns from the power-saving mode and the mouse cursor is re-displayed, or when the mouse cursor is jumped from one display screen to another.

This and other advantages of the present invention will become apparent to those skilled in the art upon reading and understanding the following detailed description with reference to the accompanying figures.

DESCRIPTION OF THE PREFERRED EMBODIMENTS

Hereinafter, an embodiment of the present invention will be described with reference to the drawings.

Figure 1:
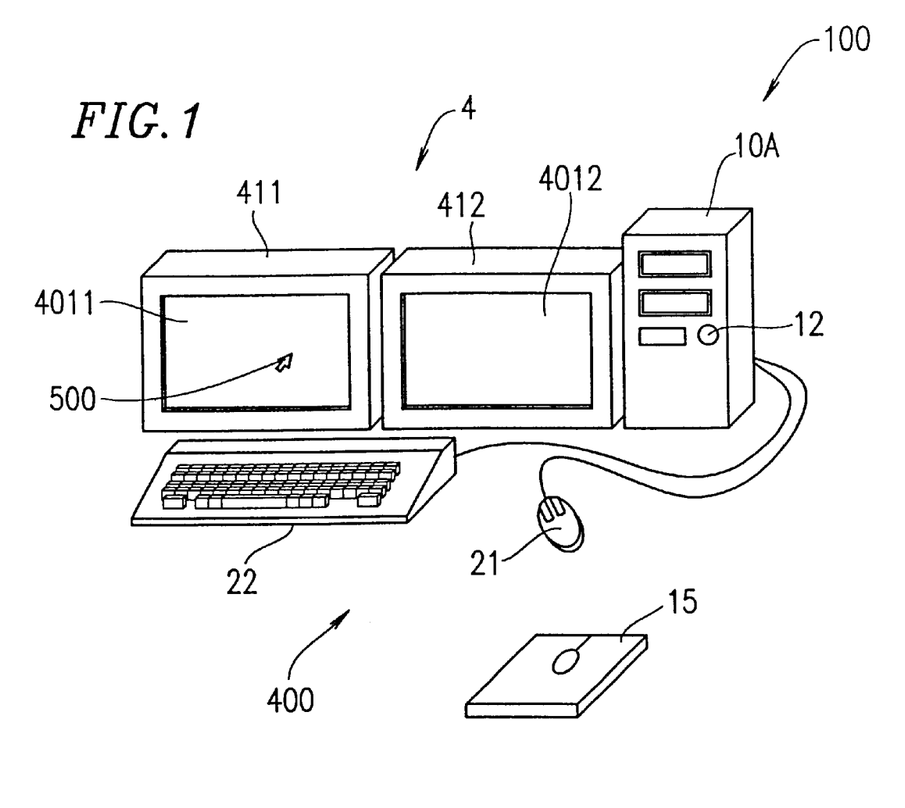
FIG. 1 shows an example of a multi-display system 100 according to one embodiment of the present invention.
Figure 2:
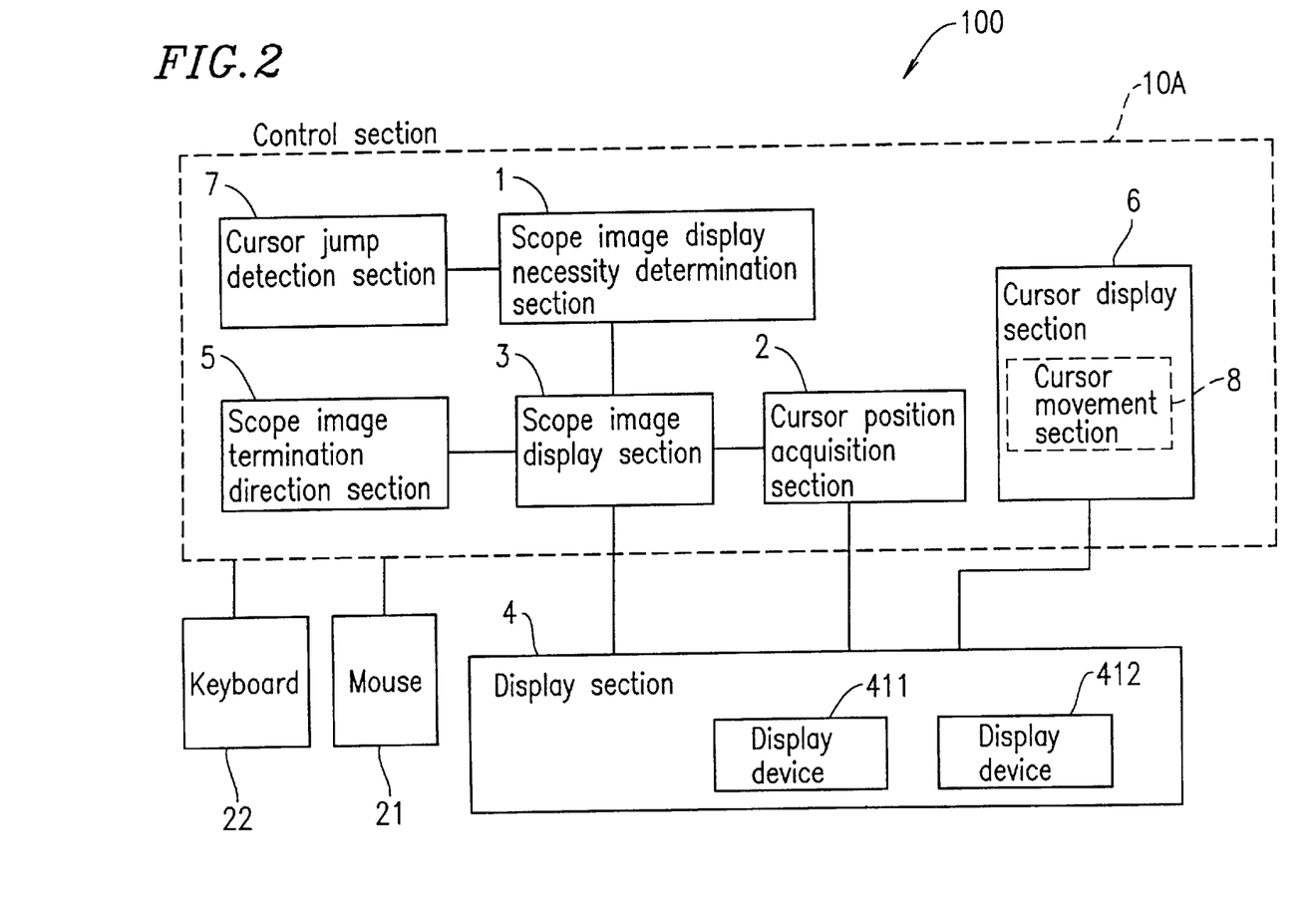
FIG. 2 schematically shows a configuration of the multi-display system 100.

FIG. 1 shows an example of a multi-display system 100 according to one embodiment of the present invention. FIG. 2 schematically shows a configuration of the multi-display system 100. In FIGS. 1 and 2, like elements are indicated by like reference numerals used for the multi-display system 400 of FIG. 7, and detailed descriptions thereof are omitted.

Referring to FIGS. 1 and 2, the multi-display system 100 includes a display section 4, an information processing apparatus 10A for controlling the display section 4, a mouse 21 connected to the information processing apparatus 10A, and a keyboard 22 connected to the information processing apparatus 10A. The display section 4 includes a first display device 411 and a second display device 412. The first display device 411 has a first display screen 4011, and the second display device 412 has a second display screen 4012. On one of the first display screen 4011 and the second display screen 4012, a mouse cursor 500 corresponding to the mouse 21 is displayed. With the mouse 21, a user can freely moves the mouse cursor 500 on the first display screen 4011 and the second display screen 4012.

Referring to FIG. 2, the information processing apparatus 10A includes: a cursor display section 6 for displaying the mouse cursor 500 on one of the first and second display screens 4011 and 4012; a scope image display necessity determination section 1 for determining whether it is necessary to display a scope image which helps a user to find the mouse cursor 500 displayed on one of the first and second display screens 4011 and 4012; a cursor position acquisition section 2 for acquiring a position of the mouse cursor 500 displayed on one of the first and second display screens 4011 and 4012; a scope image display section 3 for displaying the scope image in the vicinity of the mouse cursor 500 displayed on one of the first and second display screens 4011 and 4012; a scope image termination direction section 5 for directing the scope image display section 3 to terminate displaying the scope image; and a cursor jump detection section 7 for detecting a request of a cursor jump. The cursor display section 6 includes a cursor movement section 8 for moving from one of the first and second display screens 4011 and 4012 to the other.

FIGS. 3A through 3D illustrate a display example of a scope image in the case where the multi-display system 100 returns from a power saving mode.

Figure 3A:
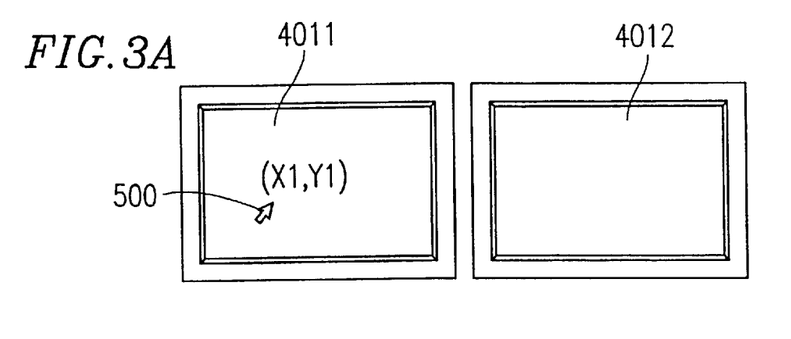
FIGS. 3A through 3D illustrate a display example of a scope image in the case where the multi-display system 100 returns from the power saving mode.

FIG. 3A shows the first and second display screens 4011 and 4012 before the multi-display system 100 enters into the power saving mode. The mouse cursor 500 is displayed at a position (X1,Y1) on the first display screen 4011.

Figure 3B:
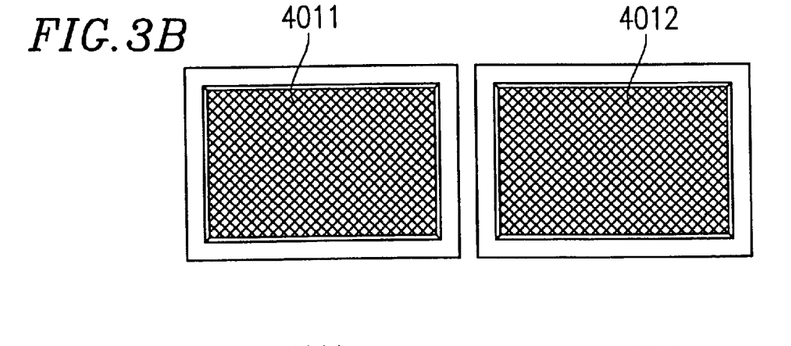

FIG. 3B shows the first and second display screens 4011 and 4012 when the multi-display system 100 is in the power saving mode. During the power saving mode, nothing is displayed on the display screens 4011 and 4012.

Figure 3C:
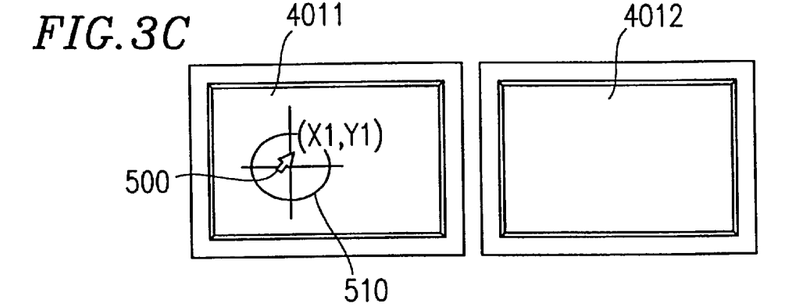

FIG. 3C shows the first and second display screens 4011 and 4012 immediately after the multi-display system 100 has returned from the power saving mode. The mouse cursor 500 is displayed at the position (X1,Y1) on the first display screen 4011, and a scope image 510 is displayed in the vicinity of the mouse cursor 500.

Figure 3D:
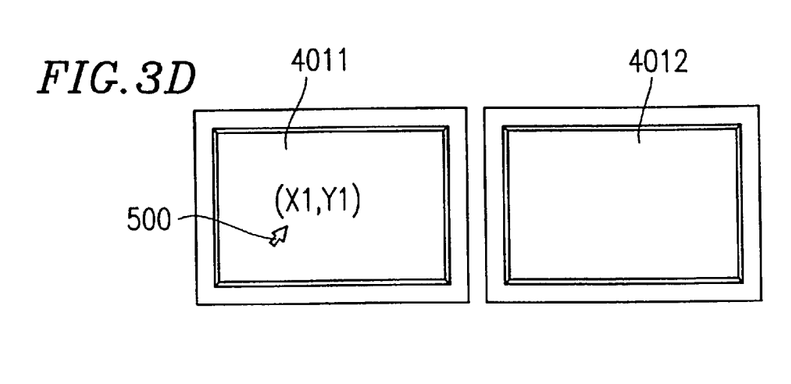

FIG. 3D shows the first and second display screens 4011 and 4012 after a predetermined time has passed since the multi-display system 100 returned from the power saving mode. The scope image 510 which had been displayed in the vicinity of the mouse cursor 500 was erased, and only the mouse cursor 500 is displayed at the position (X1,Y1) on the first display screen 4011.

Figure 4:
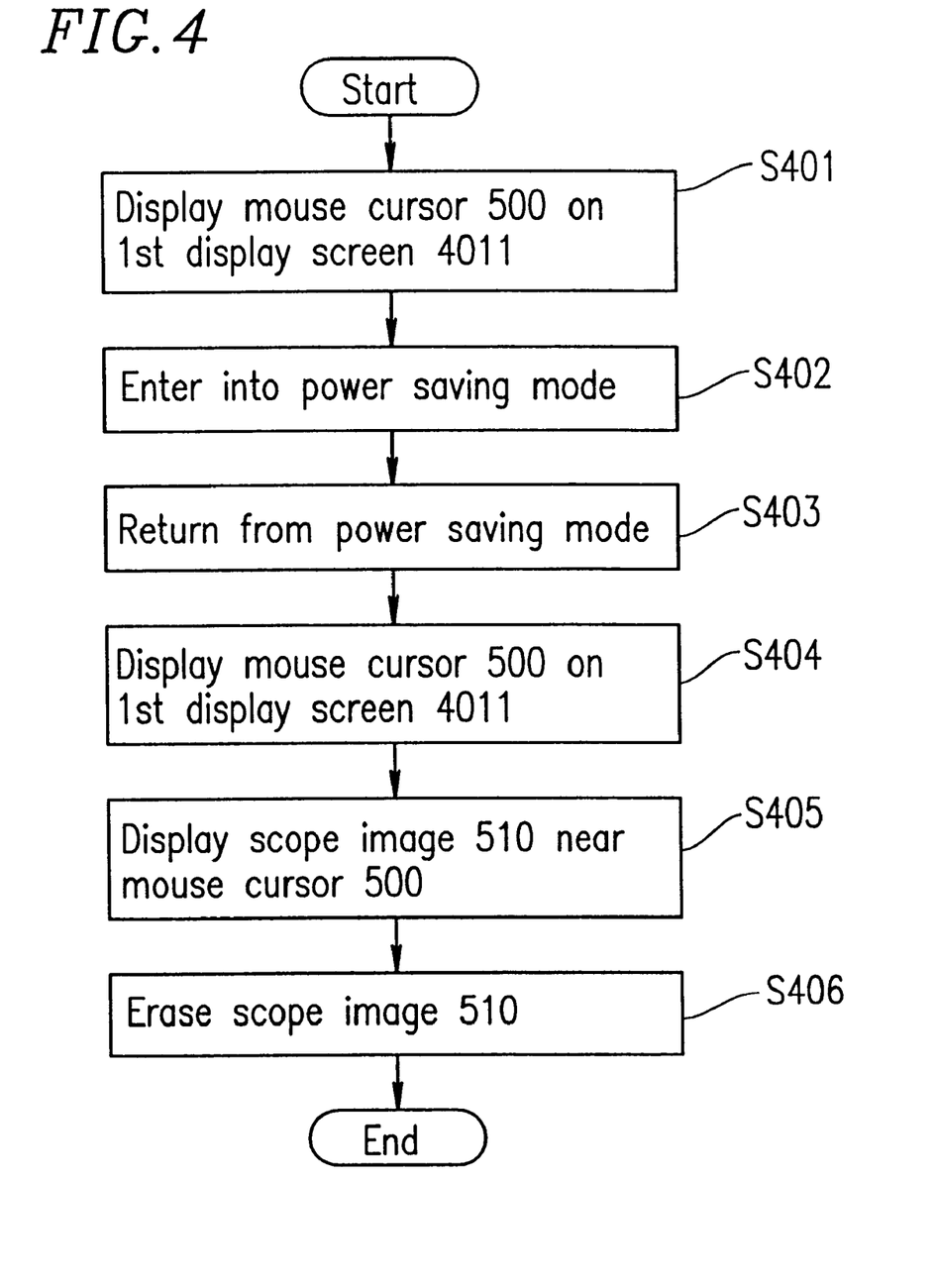
FIG. 4 is a flowchart illustrating a procedure for displaying the scope image 510 in the case where the multi-display system 100 returns from the power saving mode.

FIG. 4 is a flowchart illustrating a procedure for displaying the scope image 510 in the case where the multi-display system 100 returns from the power saving mode. The procedure for displaying the scope image 510 is now described with reference to FIG. 4 in conjunction with FIG. 2 and FIGS. 3A through 3D.

At step S401, the cursor display section 6 displays the mouse cursor 500 at the position (X1,Y1) on the first display screen 4011 as shown in FIG. 3A. At step S402, the multi-display system 100 enters into the power saving mode so that the first and second display screens 4011 and 4012 are powered-off (FIG. 3B). At step S403, the multi-display system 100 returns from the power saving mode, and the first and second display screens 4011 and 4012 are powered-on. At step S404, the cursor display section 6 displays again the mouse cursor 500 at the position (X1,Y1) on the first display screen 4011.

A power saving mode return detection section (not shown) notifies the scope image display necessity determination section 1 of the occurrence of a power saving mode return event that the multi-display system 100 returned from the power saving mode. The scope image display necessity determination section 1 determines whether or not the power saving mode return event requires a scope image to be displayed. When the scope image display necessity determination section 1 determines that a scope image is required to be displayed (in this example, the power saving mode return event requires a scope image to be displayed), the scope image display necessity determination section 1 requests the scope image display section 3 to display a scope image.

In response to the request from the scope image display necessity determination section 1, the scope image display section 3 acquires the position of the mouse cursor 500 on the first display screen 4011, the position (X1,Y1), through the cursor position acquisition section 2. Then, the scope image display section 3 displays a scope image 510 in the vicinity of the acquired position (X1,Y1) on the first display screen 4011 as shown in FIG. 3C for clearly indicating the position of the mouse cursor 500 (step S405).

Then, the scope image termination direction section 5 checks whether or not an event which satisfies a predetermined condition for terminating the display of the scope image (e.g., expiration of a predetermined time period, depression of a button of the mouse 21, key entry through the keyboard 22, etc.) occurred. If such an event occurred, the scope image termination direction section 5 directs the scope image display section 3 to terminate the display of the scope image 510. In response to the direction from the scope image termination direction section 5, the scope image display section 3 erases the scope image 510 from the first display screen 4011 as shown in FIG. 3D (step S406).

Referring to FIG. 3C, the scope image 510 is displayed in the vicinity of the mouse cursor 500. In the present specification, the expression "the scope image 510 is displayed in the vicinity of the mouse cursor 500" includes a case where the scope image 510 is displayed such that the central point of the scope image 510 is positioned substantially on the center of the mouse cursor 500 and a case where the central point of the scope image 510 is positioned slightly away from the center of the mouse cursor 500. Preferably, the scope image 510 is displayed such that the central point of the scope image 510 is positioned substantially on the center of the mouse cursor 500.

The scope image 510 is displayed in such a manner that a user can easily recognize the scope image 510 on the first display screen 4011. For example, the scope image 510 may be displayed in the form of an animation. Alternatively, the scope image 510 may be displayed in the form of a balloon. Preferably, the scope image 510 is sufficiently large so that a user can easily recognize the scope image 510. Preferably, the scope image 510 is a dynamic image. The scope image 510 may be shown as a rippling wave pattern. The scope image 510 may be a static image.

When the multi-display system 100 returned from the power saving mode, the mouse cursor 500 is displayed on the first display screen 4011, and the scope image display section 3 displays the scope image 510 in a position such that the user can see the scope image 510 substantially together with the mouse cursor 500 on the first display screen 4011. Since the scope image 510 is displayed substantially together with the mouse cursor 500, the user can easily find the mouse cursor 500 even when the mouse cursor 500 is displayed again when the multi-display system 100 returns from the power saving mode.

In an alternative example, a recording medium 15 may contain a program for allowing a computer to execute a procedure for displaying the scope image 510 in the case where the multi-display system 100 returns from the power saving mode. The information processing apparatus 10A reads the program from the recording medium 15 and executes the program, whereby the scope image 510 is displayed in the vicinity of the mouse cursor 500 when the multi-display system 100 returns from the power saving mode.

In the above example, the mouse cursor 500 and the scope image 510 are displayed on the first display screen 4011. As a matter of course, the present invention can be applied to a case where the mouse cursor 500 and the scope image 510 are displayed on the second display screen 4012.

FIGS. 5A through 5D illustrate a display example of a scope image in the case where a "cursor jump" is performed between display devices.

Figure 5A:
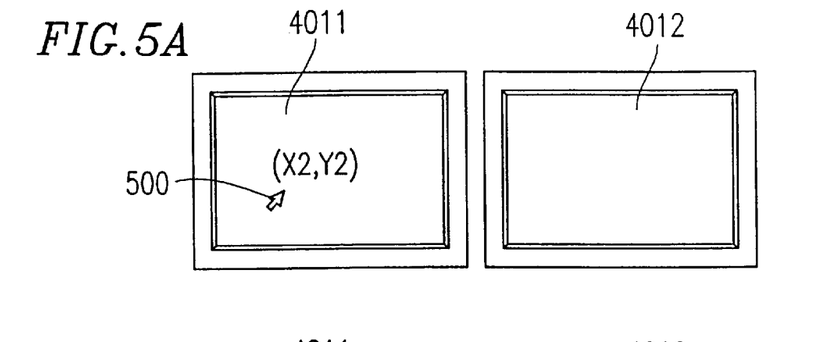
FIGS. 5A through 5D illustrate a display example of a scope image in the case where a "cursor jump" is performed between display devices.

FIG. 5A shows the first and second display screens 4011 and 4012 before the cursor jump is performed therebetween. The mouse cursor 500 is displayed by the cursor display section 6 (FIG. 2) at a position (X2,Y2) on the first display screen 4011.

Figure 5B:
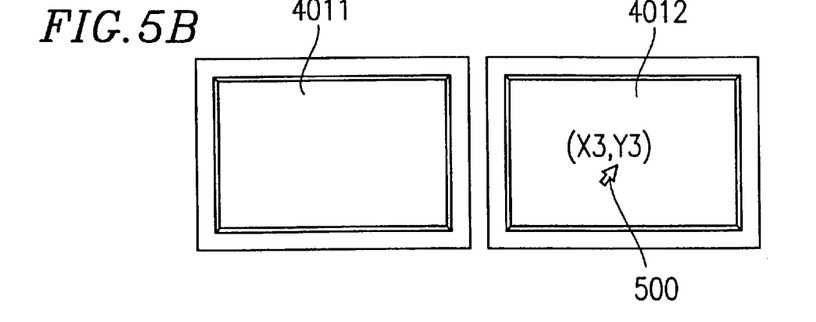

FIG. 5B shows the first and second display screens 4011 and 4012 when a cursor jump key on the keyboard 22 for directing a cursor jump between the display screens 4011 and 4012 is depressed. In response to the depression of the cursor jump key, the mouse cursor 500 jumps from the position (X2,Y2) on the first display screen 4011 to a position (X3,Y3) on the second display screen 4012.

Figure 5C:
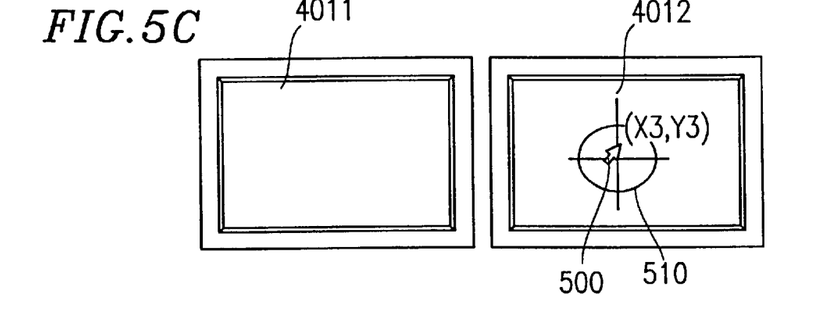

FIG. 5C shows the first and second display screens 4011 and 4012 immediately after the cursor jump has been performed, i.e., immediately after the mouse cursor 500 has jumped from the position (X2,Y2) to the position (X3,Y3). The mouse cursor 500 is displayed at the position (X3,Y3) on the second display screen 4012, and the scope image 510 is displayed in the vicinity of the mouse cursor 500.

Figure 5D:
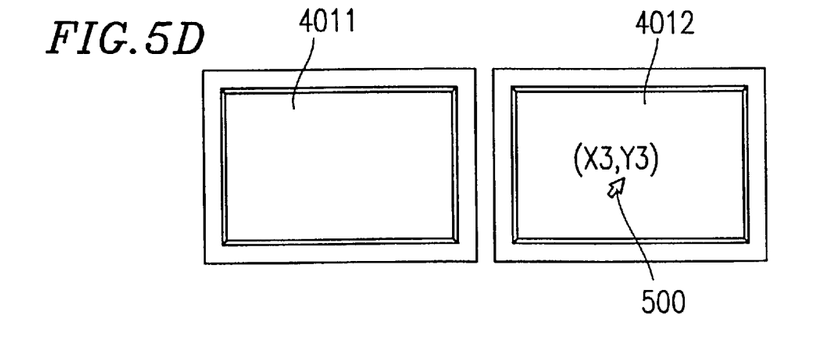

FIG. 5D shows the first and second display screens 4011 and 4012 after a predetermined time has passed since the cursor jump was performed. The scope image 510 which had been displayed in the vicinity of the mouse cursor 500 was erased, and only the mouse cursor 500 is displayed at the position (X3,Y3) on the second display screen 4012.

Figure 6:
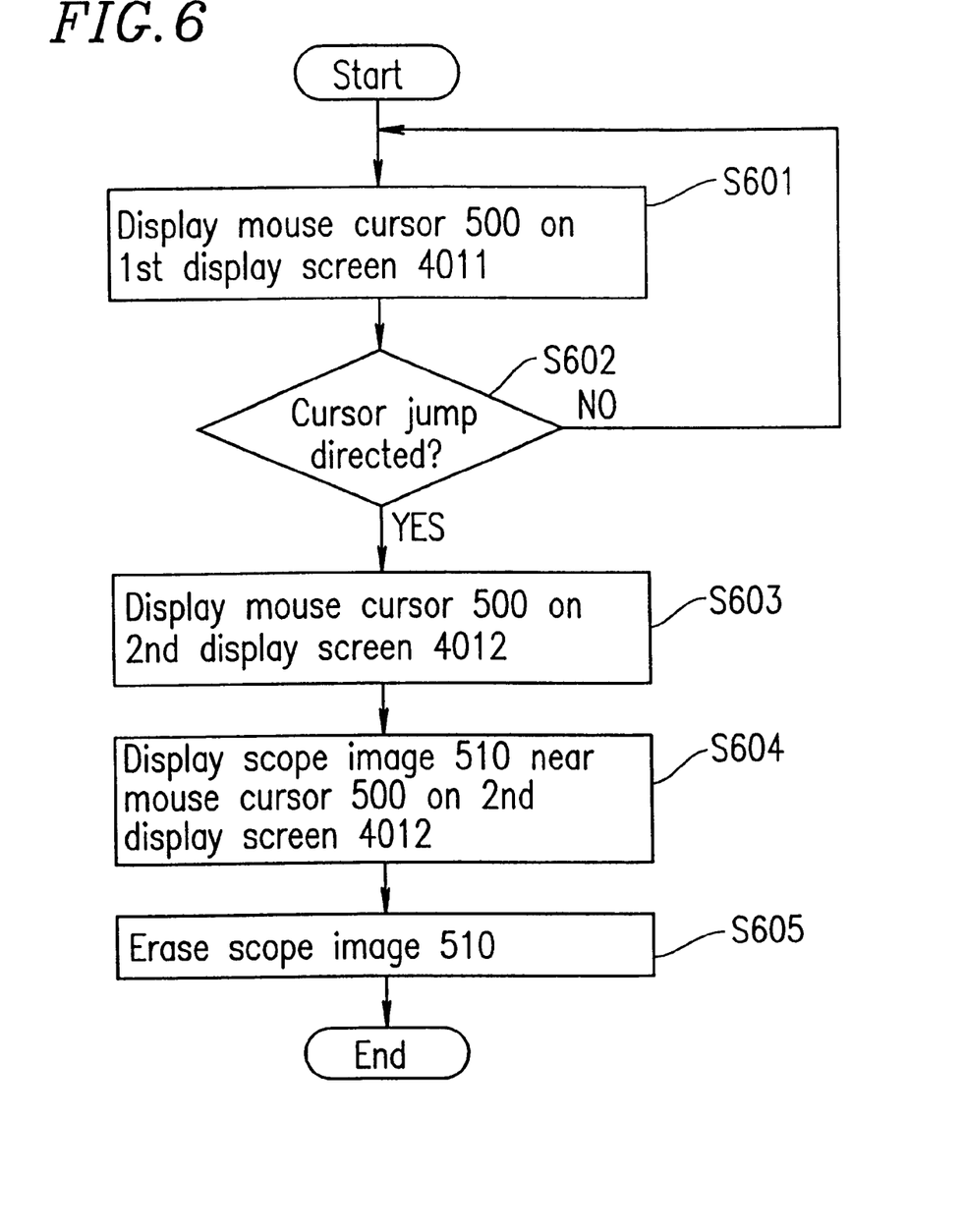
FIG. 6 is a flowchart illustrating a procedure for displaying the scope image 510 in the case where the mouse cursor 500 discontinuously moves between display devices.

FIG. 6 is a flowchart illustrating a procedure for displaying the scope image 510 in the case where the mouse cursor 500 discontinuously moves between display devices. The procedure for displaying the scope image 510 is now described with reference to FIG. 6 in conjunction with FIG. 2 and FIGS. 5A through 5D.

At step S601, the cursor display section 6 displays the mouse cursor 500 at the position (X2,Y2) on the first display screen 4011 as shown in FIG. 5A. At step S602, the cursor jump detection section 7 detects whether or not the cursor jump key on the keyboard 22 for directing a cursor jump between the display screens 4011 and 4012 is depressed. When the cursor jump detection section 7 detects depression of the cursor jump key (YES at step S602), the cursor jump detection section 7 notifies the scope image display necessity determination section 1 that a cursor jump event, such that the mouse cursor 500 jumps from the first display screen 4011 to the second display screen 4012, was requested. Meanwhile, the cursor movement section 8 moves the mouse cursor 500 from the position (X2,Y2) on the first display screen 4011 to the position (X3,Y3) on the second display screen 4012 (step S603).

The scope image display necessity determination section 1 determines whether or not the cursor jump event detected by the cursor jump detection section 7 requires a scope image to be displayed. When the scope image display necessity determination section 1 determines that a scope image is required to be displayed (in this example, the cursor jump event requires a scope image to be displayed), the scope image display necessity determination section 1 requests the scope image display section 3 to display a scope image.

In response to the request from the scope image display necessity determination section 1, the scope image display section 3 acquires the position of the mouse cursor 500 on the second display screen 4012, position (X3,Y3), through the cursor position acquisition section 2. Then, the scope image display section 3 displays a scope image 510 in the vicinity of the acquired position (X3,Y3) on the second display screen 4012 as shown in FIG. 5C for clearly indicating the position of the mouse cursor 500 (step S604).

Then, the scope image termination direction section 5 checks whether or not an event which satisfies a predetermined condition for terminating the display of the scope image (e.g., expiration of a predetermined time period, depression of a button of the mouse 21, key entry through the keyboard 22, etc.) occurred. If such an event occurred, the scope image termination direction section 5 directs the scope image display section 3 to terminate the display of the scope image 510. In response to the direction from the scope image termination direction section 5, the scope image display section 3 erases the scope image 510 from the second display screen 4012 as shown in FIG. 5D (step S605).

Referring to FIG. 5C, the scope image 510 is displayed in the vicinity of the mouse cursor 500. Preferably, the scope image 510 is displayed such that the central point of the scope image 510 is positioned substantially on the center of the mouse cursor 500. The scope image 510 is displayed in such a manner that a user can easily recognize the scope image 510 on the second display screen 4012. For example, the scope image 510 may be displayed in the form of an animation. Alternatively, the scope image 510 may be displayed in the form of a balloon. Preferably, the scope image 510 is sufficiently large so that a user can easily recognize the scope image 510. Preferably, the scope image 510 is a dynamic image. The scope image 510 may be shown as a rippling wave pattern. The scope image 510 may be a static image.

When the mouse cursor 500 discontinuously moves from one position to another, e.g., the mouse cursor 500 jumps from the first display screen 4011 to the second display screen 4012 ("cursor jump"), the scope image display section 3 displays the scope image 510 in a position such that the user can see the scope image 510 substantially together with the mouse cursor 500 on the second display screen 4012. Since the scope image 510 is displayed substantially together with the mouse cursor 500, the user can easily find the mouse cursor 500 even when the mouse cursor 500 discontinuously moves from one position to another (e.g., cursor jump).

In an alternative example, a recording medium 15 may contain a program for allowing a computer to execute a procedure for displaying the scope image 510 in the case where the mouse cursor 500 discontinuously moves from one position to another (e.g., cursor jump). The information processing apparatus 10A reads the program from the recording medium 15 and executes the program, whereby the scope image 510 is displayed in the vicinity of the mouse cursor 500 when the mouse cursor 500 discontinuously moves from one position to another (e.g., cursor jump).

In the above example, the mouse cursor 500 jumps from the first display screen 4011 to the second display screen 4012. As a matter of course, the present invention can be applied to a case where the mouse cursor 500 jumps from the second display screen 4012 to the first display screen 4011.

According to the present embodiment, the multi-display system 100 includes two display screens 4011 and 4012, but the present invention is not limited thereto. Those skilled in the art readily appreciate that the present invention can be applied to both a multi-display system including three or more display screens and a multi-display system including only one display screen.

Furthermore, a scope image of the present invention is not limited to the scope image 510 shown in FIGS. 3C and 5C.

As described hereinabove, according to the present invention, a user of the display system can quickly find a mouse cursor on a display screen even when the display system returns from the power-saving mode, and the mouse cursor is re-displayed on the display screen.

Furthermore, according to the present invention, even when the mouse cursor discontinuously moves from one position to another (e.g., cursor jump), the user of the display system can quickly find the mouse cursor on the display screen.

Thus, according to the present invention, there are provided a display system, a cursor position indication method, and a recording medium for helping a user of the display system to readily find a mouse cursor even when the display system returns from the power-saving mode and the mouse cursor is re-displayed on the display screen, or even when the mouse cursor discontinuously moves between display devices.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A display system, comprising:
    a display section; and
    a control section for controlling the display section,
    wherein the control section includes,
        a cursor display section for displaying a cursor on the display section, and
        a cursor position indication image display section for displaying on the display section, based on a predetermined condition, a cursor position indication image which indicates a position of the cursor displayed by the cursor display section, and
        the cursor position indication image display section displays the cursor position indication image in the vicinity of the cursor displayed by the cursor display section;
    wherein the predetermined condition includes transition of the cursor from a non-display state to a display state.

2. A display system according to claim 1, wherein the cursor position indication image display section displays the cursor position indication image in a position such that a user of the display system can see the cursor position indication image substantially together with the cursor on the display section.

3. A display system according to claim 1, wherein the cursor position indication image display section displays the cursor position indication image such that a central position of the cursor position indication image is positioned substantially on a central position of the cursor.

4. A display system according to claim 1, wherein the cursor position indication image display section displays the cursor position indication image in such a manner that the user of the display system can readily recognize the cursor position indication image on the display section.

5. A display system according to claim 4, wherein:
    the non-display state includes a state where the power to the display section is off; and
    the display state includes a state where the display section is powered-on again.

6. A display system according to claim 1, wherein:
    the display section includes a plurality of display screens; and
    the cursor display section displays the cursor on one of the plurality of display screens.

7. A display system according to claim 1, wherein the cursor position indication image includes a dynamic image.

8. A display system according to claim 1, wherein:
    the control section includes a cursor position indication image termination direction section for directing termination of display of the cursor position indication image based on a predetermined termination condition; and
    the cursor position indication image display section terminates the display of the cursor position indication image on the display section in response to the direction from the cursor position indication image termination direction section.

9. A display system according to claim 8, wherein the predetermined termination condition includes an expiration of a predetermined time period since the cursor position indication image was displayed on the display section by the cursor position indication image display section for indicating the position of the cursor displayed by the cursor display section.

10. A display system according to claim 1, wherein:
the display section includes a single display screen; and
the cursor display section displays the cursor on the single display screen.

11. A display system comprising:
a display section; and
a control section for controlling the display section,
wherein the control section includes,
a cursor display section for displaying a cursor on the display section,
a cursor position indication image display section for displaying on the display section, based on a predetermined condition, a cursor position indication image which indicates a position of the cursor displayed by the cursor display section,
the cursor position indication image display section displays the cursor position indication image in the vicinity of the cursor displayed by the cursor display section;
the display section includes a plurality of display screens; and
the cursor display section displays the cursor on one of the plurality of display screens;
the cursor display section includes a cursor movement section for moving the cursor front one display screen to another display screen amongst the plurality of display screens; and
the predetermined condition includes a movement of the cursor by the cursor movement section from one display screen to another display screen among the plurality of display screens.

12. A cursor position indication method, comprising:
a cursor display step of displaying a cursor on a display section; and
a cursor position indication image display step of displaying on the display section, based on a predetermined condition, a cursor position indication image which indicates a position of the cursor displayed by the cursor display step,
wherein the cursor position indication image display step includes a step of displaying the cursor position indication image in the vicinity of the cursor displayed by the cursor display step,
wherein the predetermined condition includes transition of the cursor from a non-display state to a display state.

13. A cursor position indication method according to claim 12, wherein:
the non-display state includes a state where the power to the display section is off; and
the display state includes a state where the display section is powered-on again.

14. A cursor position indication method according to claim 12, wherein:
the display section includes a plurality of display screens; and
the cursor display step includes a step of displaying the cursor on one of the plurality of display screens.

15. A cursor position indication method according to claim 12, wherein the cursor position indication image includes a dynamic image.

16. A cursor position indication method according to claim 12, wherein:
the cursor position indication method further includes a cursor position indication image termination direction step of directing termination of display of the cursor position indication image based on a predetermined termination condition; and
the cursor position indication image display step includes a step of terminating the display of the cursor position indication image on the display section in response to the direction by the cursor position indication image termination direction step.

17. A cursor position indication method according to claim 16, wherein the predetermined termination condition includes an expiration of a predetermined time period since the cursor position indication image was displayed on the display section at the cursor position indication image display step for indicating the position of the cursor displayed by the cursor display step.

18. A cursor position indication method according to claim 12, wherein:
the display section includes a single display screen; and
the cursor display step includes a step of displaying the cursor on the single display screen.

19. A cursor position indication method comprising:
a cursor display step of displaying a cursor on a display section; and
a cursor position indication image display step of displaying on the display section, based on a predetermined condition, a cursor position indication image which indicates a position of the cursor displayed by the cursor display step,
wherein the cursor position indication image display step includes a step of displaying the cursor position indication image in the vicinity of the cursor displayed by the cursor display step,
the display section includes a plurality of display screens; and
the cursor display step includes a step of displaying the cursor on one of the plurality of display screens,
the cursor display step includes a cursor movement step of moving the cursor from one display screen to another display screen amongst the plurality of display screens; and
the predetermined condition includes a movement of the cursor by the cursor movement step from one display screen to another display screen among the plurality of display screens.

20. A computer-readable recording medium containing a program for allowing a computer to execute:
a cursor display step of displaying a cursor on a display section; and
a cursor position indication image display step of displaying on the display section, based on a predetermined condition, a cursor position indication image which indicates a position of the cursor displayed by the cursor display step,
wherein the cursor position indication image display step includes a step of displaying the cursor position indication image in the vicinity of the cursor displayed by the cursor display step; and wherein the predetermined condition includes transition of the cursor from a non-display state to a display state.

21. A computer-readable recording medium according to claim 20, wherein:
the non-display state includes a state where the power to the display section is off; and
the display state includes a state where the display section is powered-on again.

22. A computer-readable recording medium according to claim 20, wherein:
the display section includes a plurality of display screens; and
the cursor display step includes a step of displaying the cursor on one of the plurality of display screens.

23. A computer-readable recording medium according to claim 20, wherein the cursor position indication image includes a dynamic image.

24. A computer-readable recording medium according to claim 20, wherein:
the program further allows the computer to execute a cursor position indication image termination direction step of directing termination of display of the cursor position indication image based on a predetermined termination condition; and
the cursor position indication image display step includes a step of terminating the display of the cursor position indication image on the display section in response to the direction by the cursor position indication image termination direction step.

25. A computer-readable recording medium according to claim 24, wherein the predetermined termination condition includes an expiration of a predetermined time period since the cursor position indication image was displayed on the display section at the cursor position indication image display step for indicating the position of the cursor displayed by the cursor display step.

26. A computer-readable recording medium according to claim 20, wherein:
the display section includes a single display screen; and
the cursor display step includes a step of displaying the cursor on the single display screen.

27. A computer-readable recording medium containing a program for allowing a computer to execute:
a cursor display step of displaying a cursor on a display action; and
a cursor position indication image display step of displaying on the display section, based on a predetermined condition, a cursor position indication image which indicates a position of the cursor displayed by the cursor display step,
wherein the cursor position indication image display step includes a step of displaying the cursor position indication image in the vicinity of the cursor displayed by the cursor display step,
the display section includes a plurality of display screens;
the cursor display step includes a step of displaying the cursor on one of the plurality of display screens;
the cursor display step includes a cursor movement step of moving the cursor from one display screen to another display screen amongst the plurality of display screens; and
the predetermined condition includes a movement of the cursor by the cursor movement step from one display screen to another display screen among the plurality of display screens.

* * * * *